US006598386B2

United States Patent
Johnson et al.

(10) Patent No.: US 6,598,386 B2
(45) Date of Patent: Jul. 29, 2003

(54) JET ENGINE THRUST REVERSER SYSTEM HAVING TORQUE LIMITED SYNCHRONIZATION

(75) Inventors: Andrew T. Johnson, Scottsdale, AZ (US); Kevin K. Chakkera, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/981,011

(22) Filed: Oct. 16, 2001

(65) Prior Publication Data

US 2003/0070416 A1 Apr. 17, 2003

(51) Int. Cl.[7] .................................................. F02K 1/76
(52) U.S. Cl. .............. 60/226.2; 244/110 B; 239/265.29
(58) Field of Search ........................ 60/226.2, 230; 244/110 B; 239/265.25, 265.27, 265.29, 265.31

(56) References Cited

U.S. PATENT DOCUMENTS

| 2,660,281 A | * | 11/1953 | Ochtman | 192/141 |
| 2,819,589 A | * | 1/1958 | Geyer | 92/116 |
| 3,596,740 A | * | 8/1971 | Nau | 188/134 |
| 4,442,928 A | * | 4/1984 | Eastman | 192/141 |
| 4,458,582 A | * | 7/1984 | Linton | 91/466 |
| 4,459,121 A | | 7/1984 | Gazzera et al. | |
| 4,543,783 A | | 10/1985 | Greiine et al. | |
| 4,579,039 A | | 4/1986 | Ebbing | |
| 4,898,265 A | | 2/1990 | Metcalf | |
| 5,280,704 A | | 1/1994 | Anderson et al. | |
| 5,359,848 A | | 11/1994 | Davies | |
| 5,609,020 A | | 3/1997 | Jackson et al. | |
| 5,769,362 A | | 6/1998 | Greene et al. | |
| 6,094,908 A | | 8/2000 | Baudu et al. | |

FOREIGN PATENT DOCUMENTS

| EP | 0 102 684 A | 3/1984 |
| WO | WO 86/00862 | 2/1986 |
| WO | PCT/US02/32965 | 12/2002 |

* cited by examiner

Primary Examiner—Ted Kim
(74) Attorney, Agent, or Firm—Keith A. Newburry, Esq.

(57) ABSTRACT

A thrust reverser system that has one or more moveable thrust reverser components for redirecting the thrust of a jet engine. The thrust reverser system has a torque limiter coupled between synchronization mechanisms that mechanically couple actuators used to drive the thrust reverser. The torque limiter reduces the potential for the transmission of excessive torque between thevdifferent moveable thrust reverser components, and reduces the likelihood of secondary system damage due to a jam in the system. Thus, the cost and/or weight associated with each of the components comprising the system may be reduced.

13 Claims, 5 Drawing Sheets

JET ENGINE THRUST REVERSER SYSTEM HAVING TORQUE LIMITED SYNCHRONIZATION

BACKGROUND OF THE INVENTION

The present invention relates to a jet engine thrust reverser system and, more particularly, to a thrust reverser system that includes a torque limiter coupled to synchronization mechanisms that ensures the thrust reverser components move in a substantially coordinated manner.

When jet-powered aircraft land, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position.

The moveable thrust reverser components in each of the above-described designs are moved between the stowed and deployed positions by means of actuators. Power to drive the actuators may come from one or more drive motors, or from a hydraulic fluid system connected to the actuators, depending on the system design. One or more synchronization mechanisms, such as flexible rotating shafts, may interconnect the actuators (and drive motors, if included) to maintain synchronous movement of the moveable thrust reverser components. One problem with this arrangement, however, is that secondary damage to various portions of the thrust reverser system may result under certain failure modes. For example, if one of the actuators becomes jammed, all of the driving force from the remaining operable actuators is concentrated, via the synchronization mechanisms, on the jammed actuator. This may result in damage to actuator system components, including the motors (if included), actuators, synchronization mechanisms, or the moveable thrust reversers components. One solution is to use stronger components, but this increases the cost and weight of the thrust reverser system.

Hence, there is a need for a thrust reverser system that improves upon one or more of the drawbacks identified above. Namely, a system that reduces the likelihood of secondary component damage if thrust reverser system fails, for example, by a jammed actuator, without having to increase the cost and/or the weight of the thrust reverser system components.

SUMMARY OF THE INVENTION

The present invention relates to a jet engine thrust reverser system that includes a torque limiter coupled to the synchronization mechanisms that maintain the thrust reversers in substantial synchronism with each other, thereby limiting potential system damage under certain failure modes.

In an aspect of the present invention, a control system for moving a thrust reverser includes first and second actuators, first and second synchronization mechanisms, and a torque limiter. The first and second actuators are operably coupled to receive a driving force to thereby move first and second thrust reverser components, respectively, between stowed and deployed positions. The synchronization mechanisms mechanically couple the first and second actuators and are configured to maintain the actuators in substantial synchronization with one another upon receipt of the driving force by the actuators. The torque limiter is operably coupled between the two synchronization mechanisms, and is activated upon a predetermined torque value being reached between the operably coupled synchronization mechanisms.

DETAILED DESCRIPTION OF PREFERRED EMBODIMENTS

Before proceeding with the detailed description of the invention, it is to be appreciated that the present invention is not limited to use in conjunction with a specific thrust reverser system design. Thus, although the present invention is explicitly described as being implemented in a cascade-type thrust reverser system, in which transcowls are used as the moveable thrust reverser component, it should be appreciated that it can be implemented in other thrust reverser system designs, including those described above and those known in the art.

Figure 1:
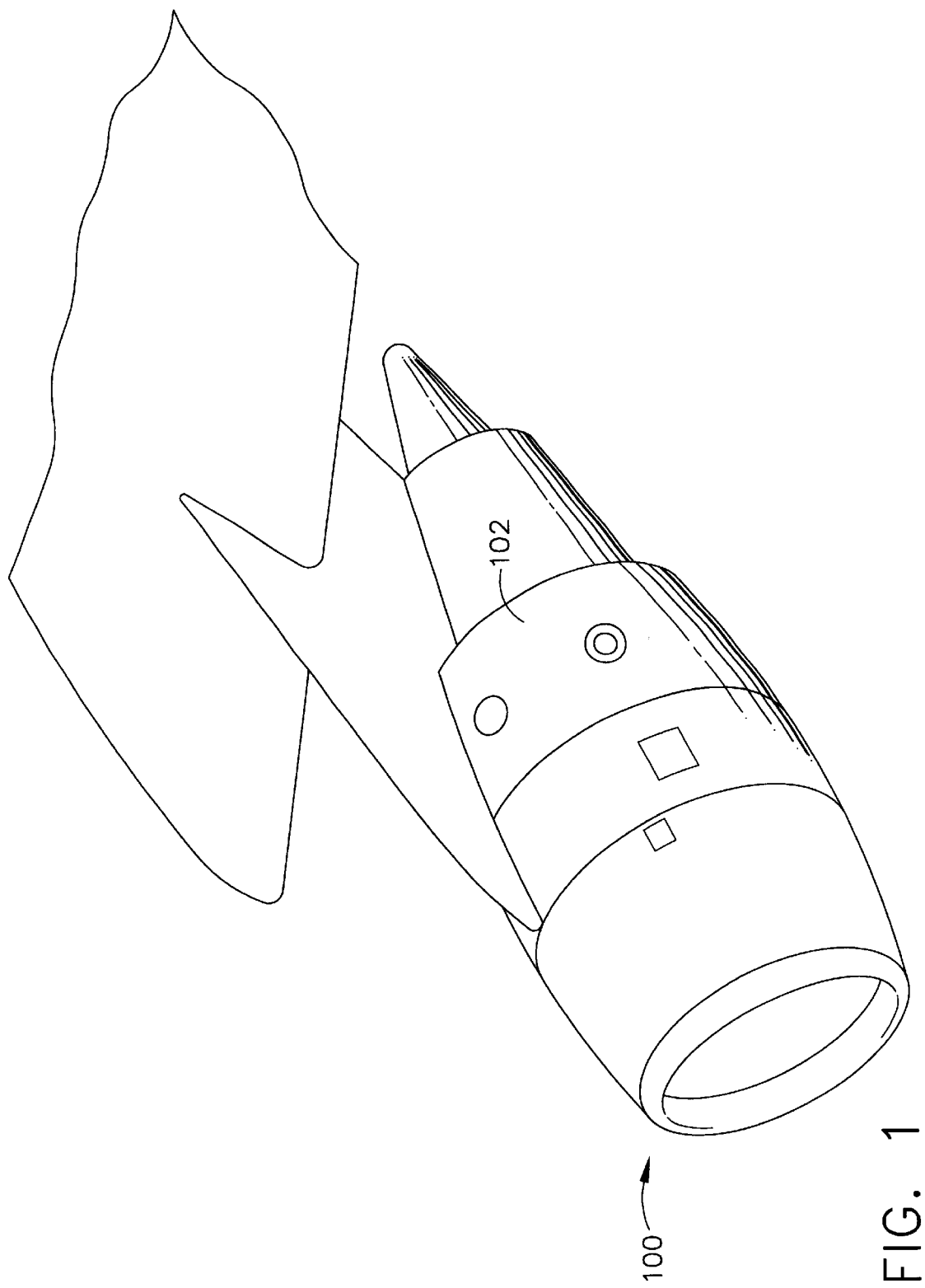
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 (only 102 shown in FIG. 1) that are positioned circumferentially on the outside of the fan case 100.

Figure 2:
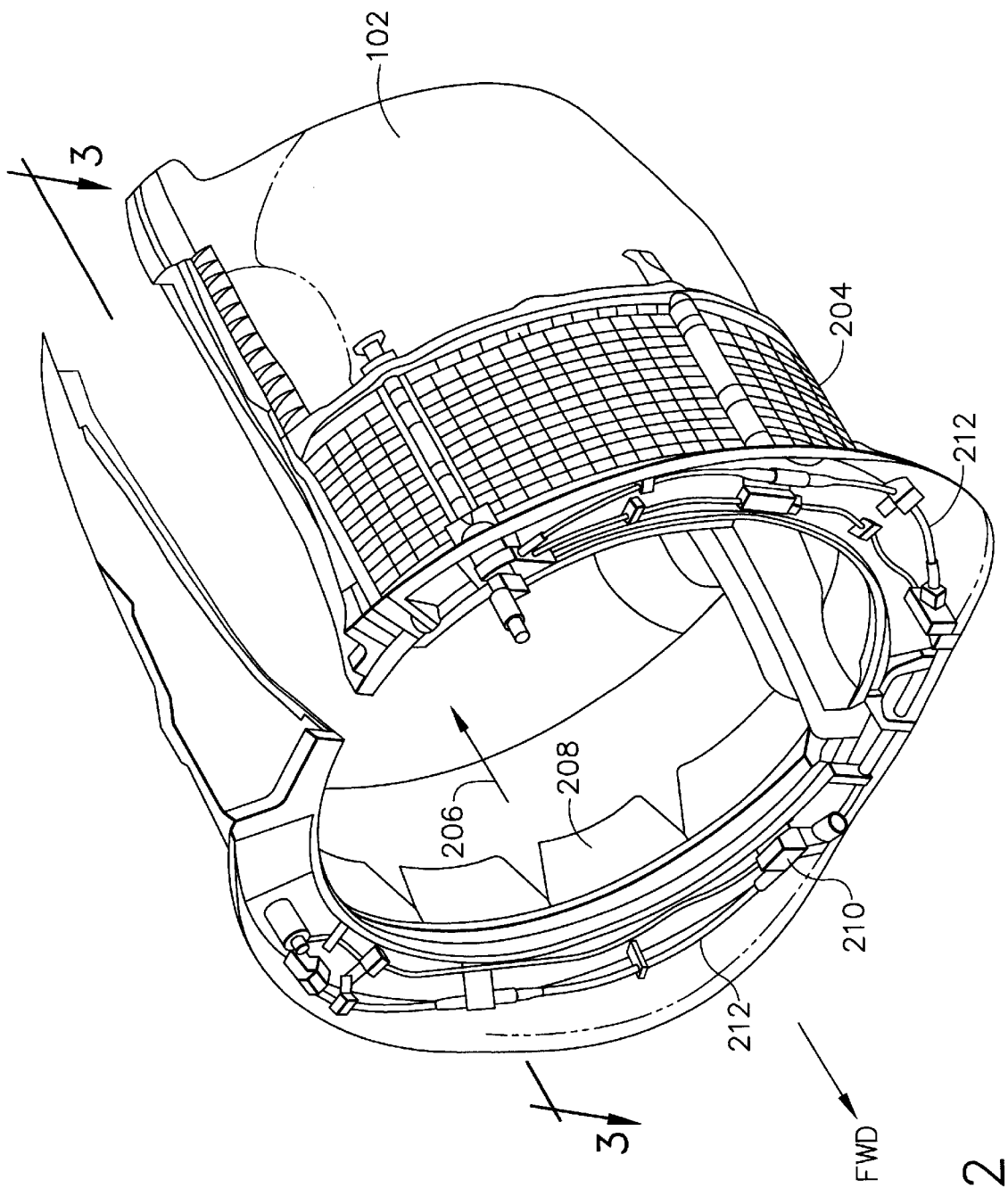
FIG. 2 is a perspective view of portions of an engine fan cowl and thrust reverser system utilized with the engine of FIG. 1.
Figure 3:
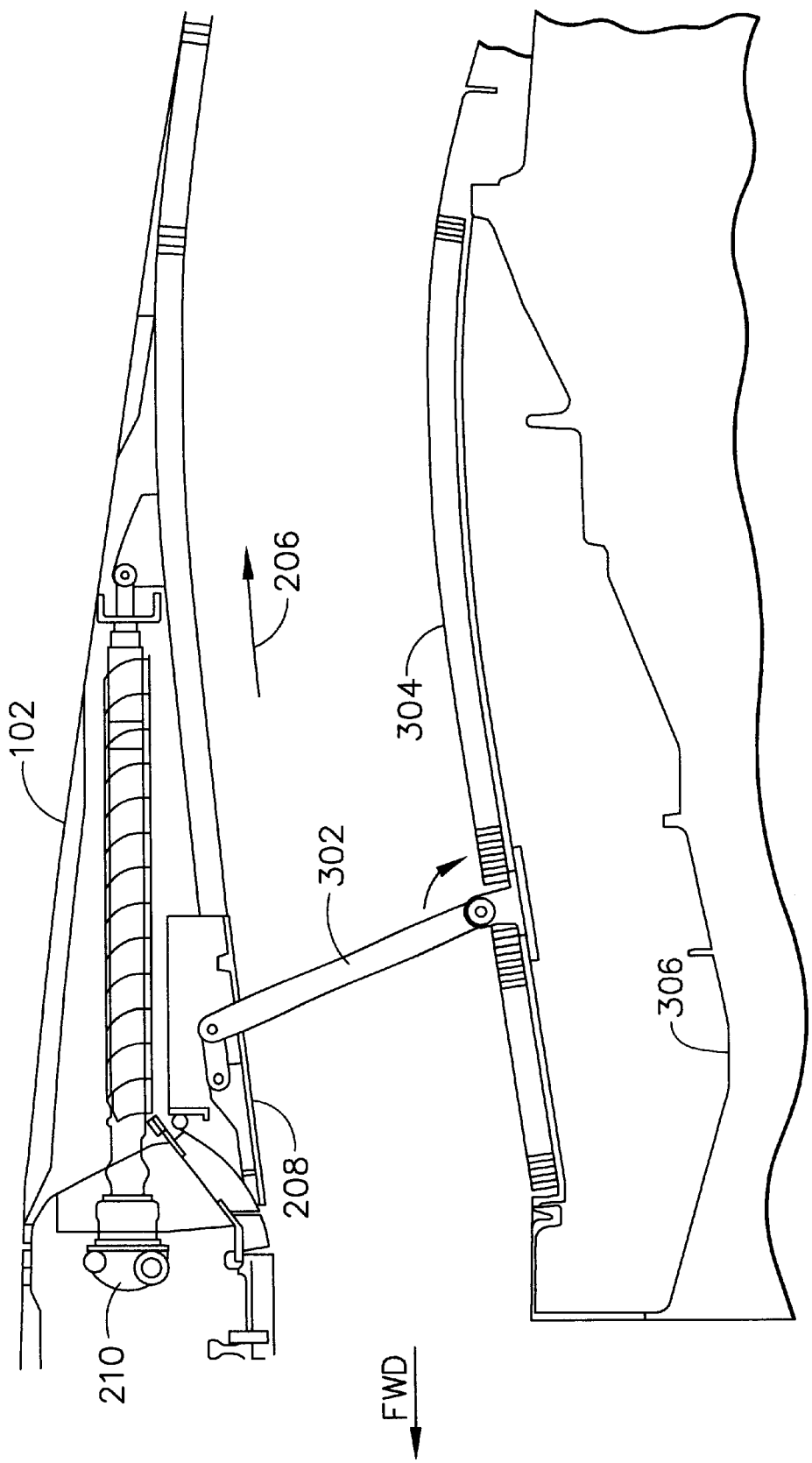
FIG. 3 is a partial cross section view taken along line 3—3 of FIG. 2.
Figure 4:
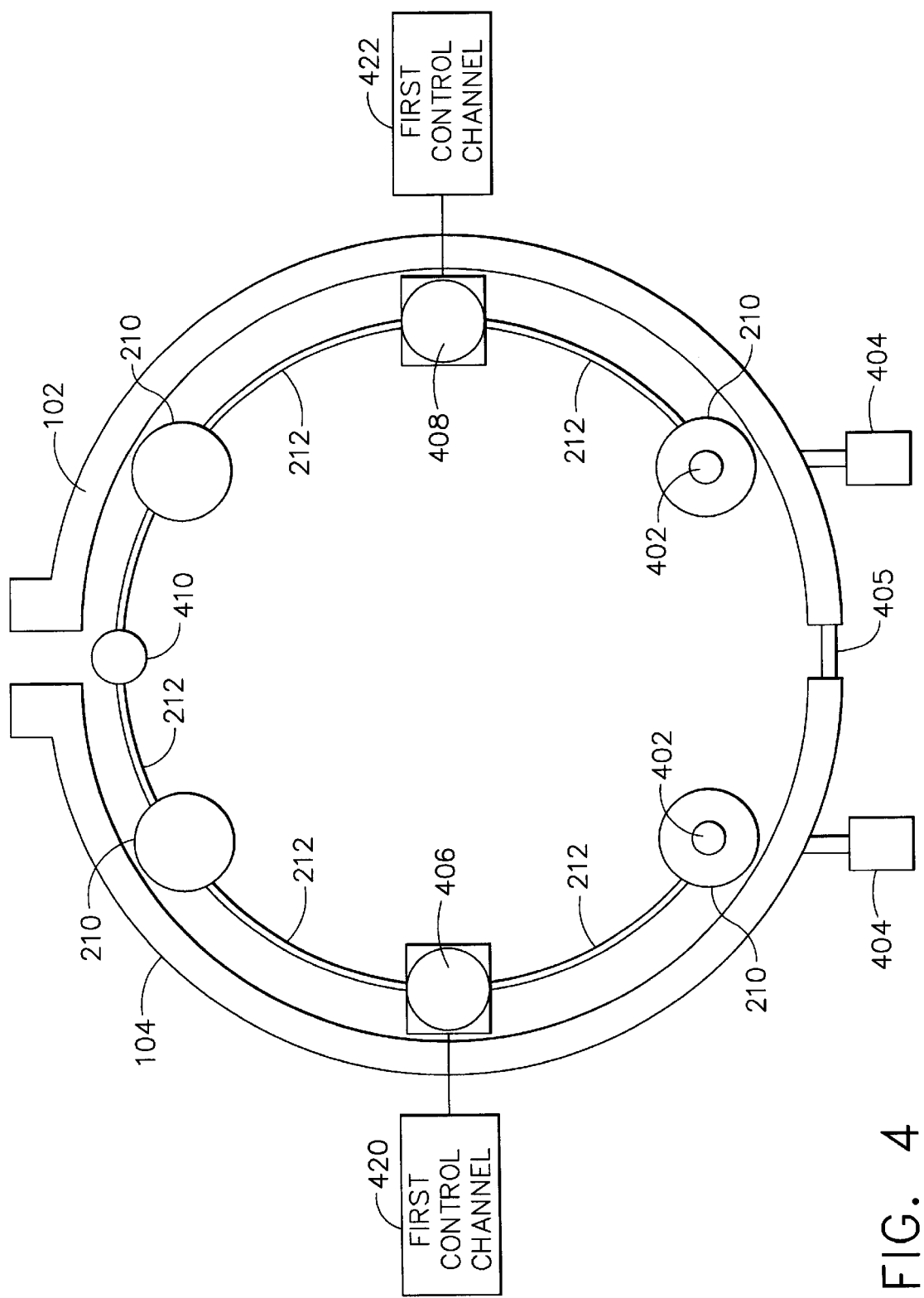
FIG. 4 is a simplified end view of a thrust reverser actuation system according to a first embodiment of the present invention.

As shown more particularly in FIGS. 2, 3 and 4, the transcowls 102, 104 (only 102 shown in FIGS. 2 and 3) cover a plurality of cascade vanes 204, which are positioned between the transcowls 102 and a bypass air flow path 206. A mechanical link 405, such as a pin or latch, may couple the transcowls 102 together to maintain the transcowls 102, 104 in correct alignment on the guides (unillustrated) on which the transcowls 102, 104 translate. A series of blocker doors 208 are mechanically linked to the transcowls 102, 104 via a drag link 302 that is rotatably connected to an outer wall 304 that surrounds the engine case 306. In the stowed position, the blocker doors 208 form a portion of the outer wall 304 and are therefore oriented parallel to a bypass air flow path 206. When the thrust reversers are commanded to deploy, the transcowls 102, 104 are translated aft, causing the blocker doors 208 to rotate into a deployed position, such that the bypass air flow path 206 is blocked. This also causes the cascade vanes 204 to be exposed and the bypass air flow to be redirected out the cascade vanes 204. The re-direction of the bypass air flow in a forward direction creates a reverse thrust and, thus, works to slow the airplane.

A plurality of actuators 210 are individually coupled to the transcowls 102, 104. In a preferred embodiment, half of the actuators 210 are coupled to one of the transcowls 102, and the other half are coupled to another transcowl 104. While not critical to understand or enable the present invention, it is noted that, for flight safety reasons, some or all of the actuators 210 may include locks 402, some or all of which may include position sensors. In addition, the transcowls 102 also may each include locks 404. It is noted that the actuators 210 may be any one of numerous actuator designs known in the art. However, in this embodiment the actuators 210 are ballscrew actuators. It is additionally noted that the number and arrangement of actuators 210 is not limited to what is depicted in FIGS. 2 and 4, but could include other numbers of actuators 210 as well. The number and arrangement of actuators is selected to meet the specific design requirements of the system.

The actuators 210 are interconnected via a plurality of synchronization mechanisms 212, each of which, in the particular depicted embodiment, comprises a flexible shaft. The synchronization mechanisms 212 ensure that the actuators 210, and thus all points of each the transcowl 102, 104, as well as both transcowls 102, 104, move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

As shown more particularly in FIG. 4, which depicts one particular embodiment, one or more motors are coupled to the actuators 210 via an associated synchronization mechanism 212. In the exemplary embodiment depicted in FIG. 4, a first 406 and a second 408 motor, one associated with each of the transcowls 102, 104 are used. It should be appreciated that the present invention may encompass more than this number of motors, as required to meet the specific design requirements of a particular thrust reverser system. The first 406 and second 408 motors may be either electric (including any one of the various DC or AC motor designs known in the art), hydraulic, or pneumatic motors. Moreover, though not explicitly depicted, each motor 406 and 408 may include a safety-related locking mechanism. In any case, with the depicted arrangement, the rotation of the motors 406 and 408 results in the synchronous operation of the actuators 210, via the synchronization mechanisms 212, thereby causing the transcowls 102 and 104 to move at substantially the same rate.

A torque limiter 410 is coupled to a pair of the synchronization mechanisms 212. The torque limiter 410 preferably is coupled to the pair of synchronization mechanisms that interconnect the first and second halves of the actuators 210, though it should be appreciated that the present invention is not so limited. It should additionally be appreciated that more than one torque limiter could be incorporated into the system. Moreover, various types of torque limiter designs may be used in the system, as required by particular applications. In a preferred embodiment a torque limiter design is utilized that prevents the transmission of additional torque once a predetermined torque overload is reached.

In the exemplary embodiment depicted in FIG. 4, the motors 406 and 408 may each be controlled by individual control channels. More particularly, a first control channel 420 is coupled to one motor 406, and a second control channel 422 is coupled to another motor 408. The first 420 and second 422 control channels receive commands from a non-illustrated engine control system, such as a FADEC (full authority digital engine control) system, and provide appropriate activation signals to the motors 406 and 408 in response to the received commands. In turn, the motors 406 and 408 each supply a driving force to the actuators 210 via the synchronization mechanisms 212. As a result, the actuators 208 cause the transcowls 102, 104 to translate between the stowed and deployed positions. It will be appreciated that the first 420 and second 422 control channels may be housed within a single controller unit or housed within physically separate controller units.

Figure 5:
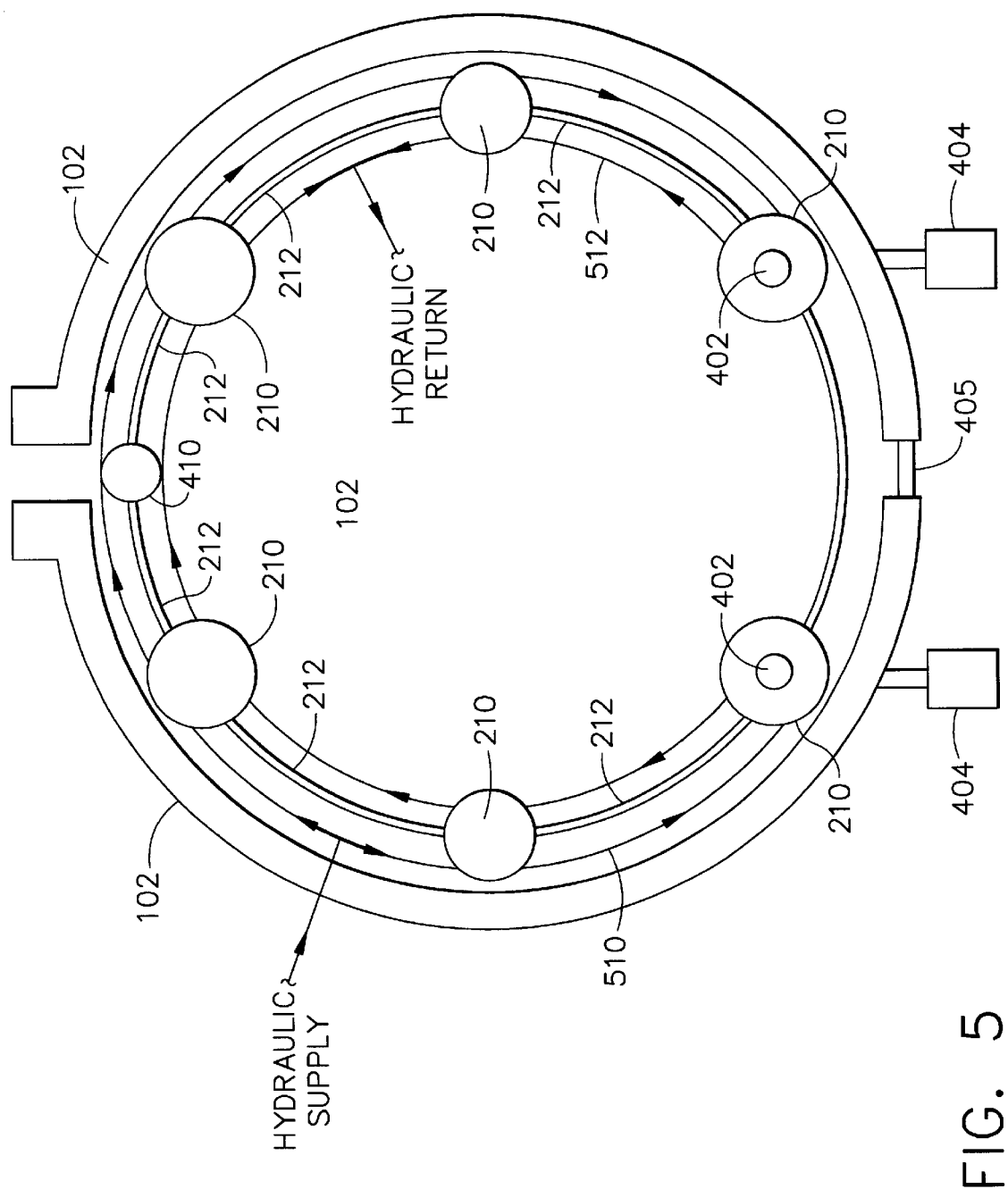
FIG. 5 is a simplified end view of a thrust reverser actuation system according to another embodiment of the present invention.

An alternate thrust reverser arrangement is depicted in FIG. 5. Similar to the embodiment of FIG. 4, this alternate system also includes a first transcowl 102 and a second 104 transcowl (both of which may also include locks 404) as the moveable thrust reverser components, coupled together with a mechanical link 405. The system further includes a plurality of actuators 210 (some of which may also include locks 402) individually coupled to the transcowls 102, and interconnected by a plurality of synchronization mechanisms 212, similar to the FIG. 1 embodiment. With the FIG. 5 system, however, there are no motors, since the actuators 210 are powered by pressurized hydraulic fluid. Thus, a system of hydraulic supply 510 and return 512 lines is provided to operate the actuators 210. The actuators 210 in this embodiment may be any one of the numerous hydraulic actuator designs known in the art, such as a rod-and-seal-piston type actuator, and may additionally include internal synchronizing mechanisms.

The systems described immediately above have associated advantages over present thrust reverser actuation system designs. Specifically, the torque limiter 410 tends to prevent the transmission of excessive torque between different moveable thrust reverser components. Additionally, secondary system damage due to an actuator jam is less likely. Thus, the cost and/or weight associated with each of the components comprising the system advantageously is reduced.

As indicated previously, the present invention is not limited to use with a cascade-type thrust reverser system, but can be incorporated into other thrust reverser designs. Moreover, the present invention is not limited to use with an electric, electro-mechanical, or hydraulic thrust reverser actuation system. Indeed, the present invention can be incorporated into other actuation system designs, including pneumatic designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to any particular embodiment disclosed for carrying out this invention, but that the invention includes all embodiments falling within the scope of the appended claims.

We claim:

1. A control system for moving a thrust reverser, comprising:

first and a second drive motor, each drive motor operable to supply a drive force;

a first actuator operably coupled to receive the drive force from the first drive motor to thereby move a first thrust reverser component between a stowed position and a deployed position;

a second actuator operably coupled to receive the drive force from the second drive motor to thereby move a second thrust reverser component between a stowed position and a deployed position;

two synchronization mechanisms mechanically coupling the first and second actuators and configured to drive the actuators in substantial synchronization with one another upon receipt, by the actuators, of the driving force; and a torque limiter separate from any actuator operably coupled between the two synchronization mechanisms, the torque limiter being activated upon a predetermined torque value being reached between the operably coupled synchronization mechanisms.

2. The system of claim 1, wherein each of the motors comprises an electric motor.

3. The system of claim 1, wherein each of the motors comprises a hydraulic motor.

4. The system of claim 1, wherein each of the motors comprises a pneumatic motor.

5. The system of claim 1, further comprising:

a controller coupled to the motors and operable to activate the motors to supply the driving force.

6. The system of claim 1, wherein the actuators each comprise ballscrews.

7. The system of claim 1, wherein the actuators each comprise hydraulically-operated piston-type actuators.

8. The system of claim 7, wherein the hydraulically-operated piston-type actuators include internal synchronizing mechanisms.

9. The system of claim 1, wherein the synchronization mechanisms each comprise a flexible shaft.

10. The system of claim 1, wherein the first and second thrust reverser components comprise a first transcowl half and a second transcowl half.

11. The system of claim 10, wherein:

the first actuator is coupled to the first transcowl half; and the second actuator is coupled to the second transcowl half.

12. The system of claim 1, wherein the torque limiter is operable to selectively slip to limit the torque between the operably coupled synchronization mechanisms to the predetermined torque value.

13. A control system for moving a thrust reverser including a first transcowl and a second transcowl, the system comprising:

a first drive motor operable to generate a first drive force;

a second drive motor operable to generate a second drive force;

a plurality of first actuators coupled to receive the first drive force from the first drive motor to thereby move the first transcowl between a stowed position and a deployed position;

a plurality of second actuators coupled to receive the second drive force from the second drive motor to thereby move the second transcowl between a stowed position and a deployed position;

a plurality of first synchronization mechanisms interconnecting the plurality of first actuators and the first motor;

a plurality of second synchronization mechanisms interconnecting the plurality of second actuators and the second motor; and a torque limiter separate from actuator operably coupled between one of the first synchronization mechanisms and one of the second synchronization mechanisms, the torque limiter being activated upon a predetermined torque value being reached between the operably coupled first and second synchronization mechanisms.

* * * * *